(12) United States Patent
Gao et al.

(10) Patent No.: US 8,264,788 B2
(45) Date of Patent: Sep. 11, 2012

(54) DISCRETE TRACK MEDIA (DTM) DESIGN AND FABRICATION FOR HEAT ASSISTED MAGNETIC RECORDING (HAMR)

(75) Inventors: Kaizhong Gao, Eden Prairie, MN (US); Michael Allen Seigler, Pittsburgh, PA (US); Xuhui Jin, Shakopee, MN (US); Ganping Ju, Sewickley, PA (US); Bin Lu, San Ramon, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 2 days.

(21) Appl. No.: 12/390,592

(22) Filed: Feb. 23, 2009

(65) Prior Publication Data

US 2010/0214684 A1    Aug. 26, 2010

(51) Int. Cl.
 *G11B 5/02* (2006.01)
(52) U.S. Cl. ........... 360/59; 360/48; 360/62; 369/13.02; 369/13.03; 369/13.33
(58) Field of Classification Search .................. None
See application file for complete search history.

(56) References Cited

U.S. PATENT DOCUMENTS

| | | | |
|---|---|---|---|
| 6,027,825 A * | 2/2000 | Shiratori et al. | 428/819 |
| 6,483,784 B1 * | 11/2002 | Nakatani et al. | 369/13.38 |
| 6,775,100 B1 | 8/2004 | Belser et al. | |
| 7,161,755 B1 | 1/2007 | Benakli et al. | |
| 7,368,184 B2 | 5/2008 | Kaizu et al. | |
| 7,394,622 B2 | 7/2008 | Gage et al. | |
| 7,818,760 B2 * | 10/2010 | Seigler et al. | 720/658 |
| 7,998,661 B2 * | 8/2011 | Kim et al. | 430/320 |
| 8,031,561 B2 * | 10/2011 | Hellwig et al. | 369/13.01 |
| 2004/0185306 A1 * | 9/2004 | Coffey et al. | 428/694 TM |
| 2005/0157597 A1 * | 7/2005 | Sendur et al. | 369/13.55 |
| 2005/0193405 A1 | 9/2005 | Hattori et al. | |
| 2005/0243467 A1 | 11/2005 | Takai et al. | |
| 2006/0002017 A1 | 1/2006 | Taguchi et al. | |
| 2006/0121318 A1 | 6/2006 | Gage et al. | |
| 2006/0138360 A1 * | 6/2006 | Martin | 250/493.1 |
| 2006/0154110 A1 * | 7/2006 | Hohlfeld et al. | 428/823 |
| 2008/0246970 A1 * | 10/2008 | Kuroda et al. | 356/445 |
| 2010/0054093 A1 * | 3/2010 | Iwata et al. | 369/13.14 |
| 2010/0061018 A1 * | 3/2010 | Albrecht et al. | 360/135 |
| 2010/0091618 A1 * | 4/2010 | Schabes et al. | 369/13.02 |
| 2010/0103553 A1 * | 4/2010 | Shimazawa et al. | 360/59 |

* cited by examiner

*Primary Examiner* — Dismery Mercedes
(74) *Attorney, Agent, or Firm* — Hall Estill Attorneys at Law

(57) ABSTRACT

An apparatus includes a recording media including a substrate, a plurality of tracks of magnetic material on the substrate, and a non-magnetic material between the tracks; a recording head having an air bearing surface positioned adjacent to the recording media, and including a magnetic pole, an optical transducer, and a near-field transducer, wherein the near-field transducer directs electromagnetic radiation onto tracks to heat portions of the tracks and a magnetic field from the magnetic pole is used to create magnetic transitions in the heated portions of the tracks; and a plasmonic material positioned adjacent to the magnetic material to increase coupling between the electromagnetic radiation and the magnetic material.

20 Claims, 10 Drawing Sheets

DISCRETE TRACK MEDIA (DTM) DESIGN AND FABRICATION FOR HEAT ASSISTED MAGNETIC RECORDING (HAMR)

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. For heat assisted magnetic recording (HAMR) a tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM) or lens, fabricated on a planar waveguide and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

HAMR is believed to be one of the candidates that will enable 1 Tb/in$^2$ areal density or above. However, as the areal density increases, there are several issues for HAMR. One of the primary problems is how to control thermal spot size. The power absorption in the recording media is highly dependent on head to media spacing (HMS), power output from NFT or laser, etc. In such a system the typical power output depends inverse exponentially with HMS due to the evanescent decay of optical near field. Such variation will lead to variation of the thermal spot size. The down track variation will cause a small position jitter. Cross track variation will cause erasure and modulation of the track width, limiting the potential areal density achievable for HAMR.

SUMMARY

In one aspect, the invention provides an apparatus including a recording media including a substrate, a plurality of tracks of magnetic material on the substrate, and a non-magnetic material between the tracks; a recording head having an air bearing surface positioned adjacent to the recording media, and including a magnetic pole, an optical transducer, and a near-field transducer, wherein the near-field transducer directs electromagnetic radiation onto tracks to heat portions of the tracks and a magnetic field from the magnetic pole is used to create magnetic transitions in the heated portions of the tracks; and a plasmonic material positioned adjacent to the magnetic material to increase coupling between the electromagnetic radiation and the magnetic material.

DETAILED DESCRIPTION OF THE INVENTION

In one aspect, this invention provides a discrete track media (DTM) for heat assisted magnetic recording (HAMR). In another aspect, this invention provides a fabrication process for making discrete track media. The discrete track media can provide many benefits, including thermal profile control, the transition curvature control, and improvement of power efficiency and reduction of HMS sensitivity for HAMR.

In a HAMR system, such media can lead to an improvement in terms of transition curvature in the write process. Due to the thermal profile in DTM HAMR, the transition location is also different from conventional HAMR. In addition, the effective separation of the thermal spot and the magnetic spot can be further reduced.

Figure 1:
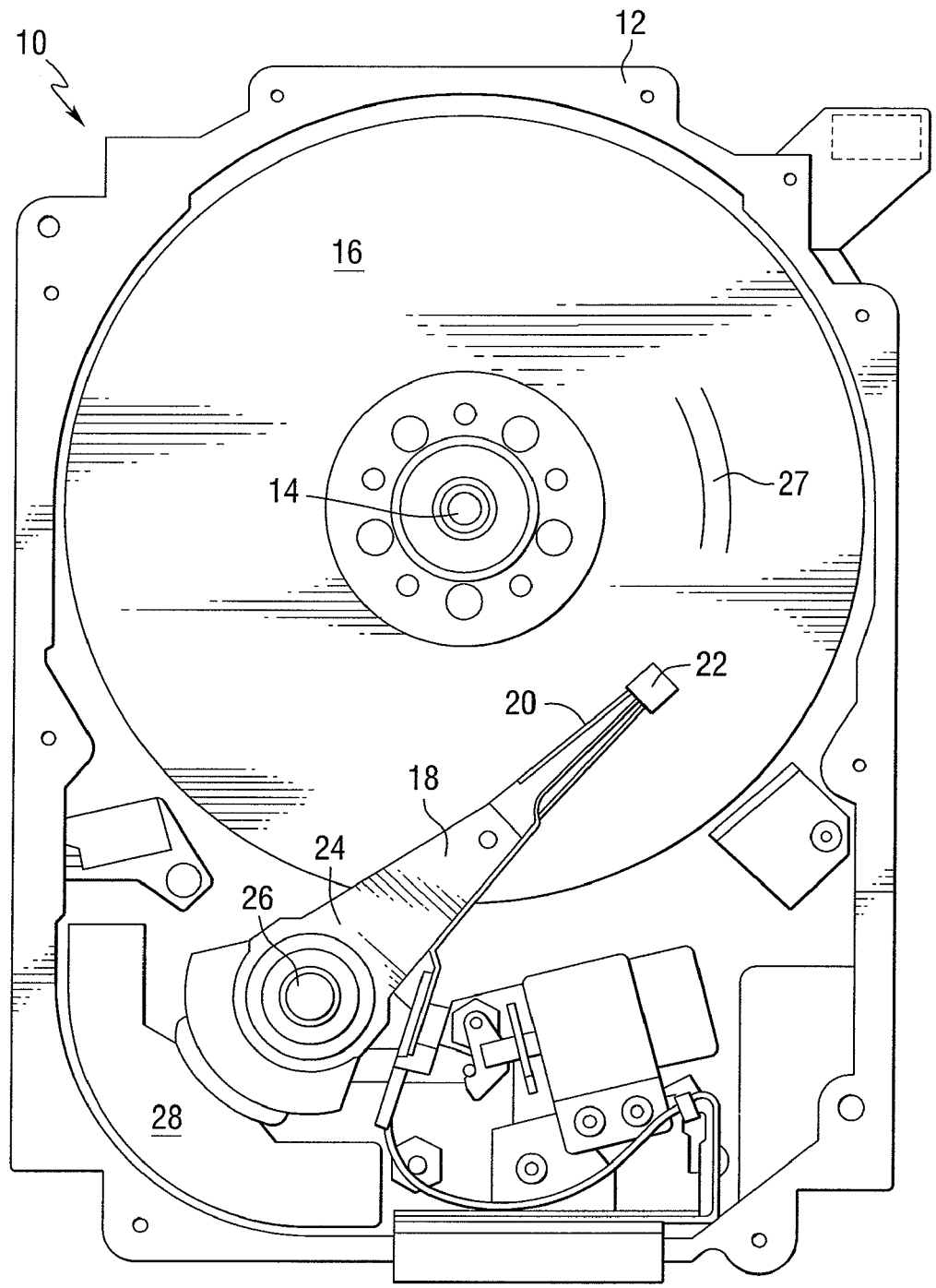
FIG. 1 is a pictorial representation of a data storage device in the form of a disc drive that can include a transducer in accordance with an aspect of this invention.

FIG. 1 is a pictorial representation of a data storage device in the form of a disc drive 10 that can utilize discrete track recording media constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data recording media to raise the temperature of a localized area of the media to facilitate switching of the magnetization of the area. Recent designs of HAMR recording heads include a thin film waveguide on a slider to guide light to the recording media for localized heating of the recording media. A near-field transducer positioned at the air bearing surface of a recording head can be used to direct the electromagnetic radiation to a small spot on the recording media.

Figure 2:
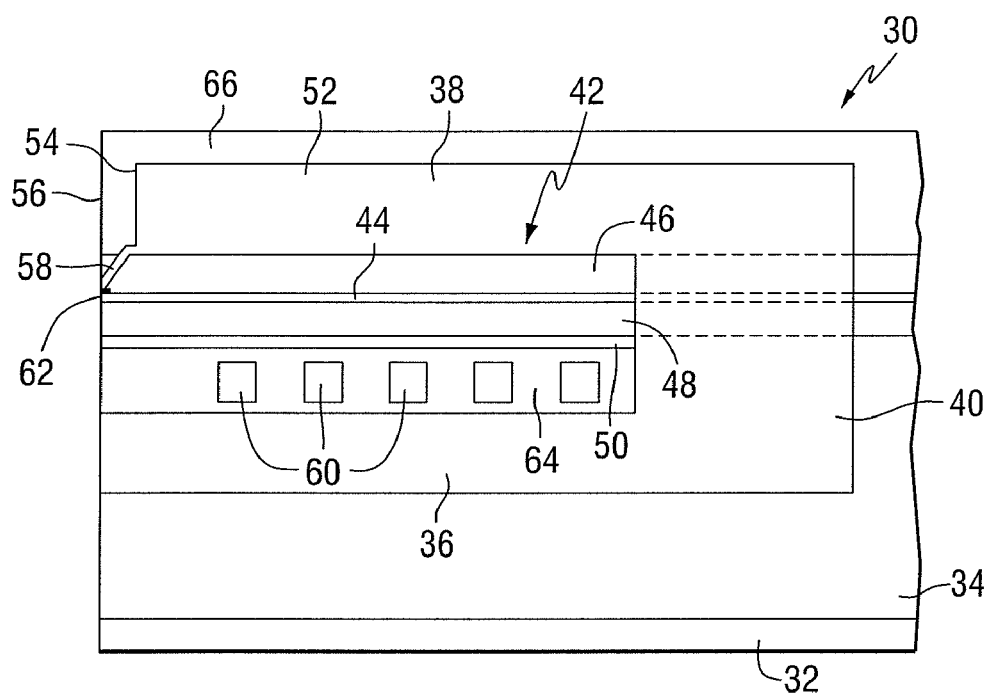
FIG. 2 is a cross-sectional view of a recording head for use in heat assisted magnetic recording.

FIG. 2 is a cross-sectional view of an example of a recording head for use in heat assisted magnetic recording. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 36 of the recording head, with the end being closer to the waveguide than the first portion of the top pole. A planar coil 60 also extends between the top and bottom poles and around the pedestal. A near-field transducer (NFT) 62 is positioned in the cladding layer 46 adjacent to the air bearing surface. An insulating material 64 separates the coil turns. Another layer of insulating material 66 is positioned adjacent to the top pole.

Figure 3:
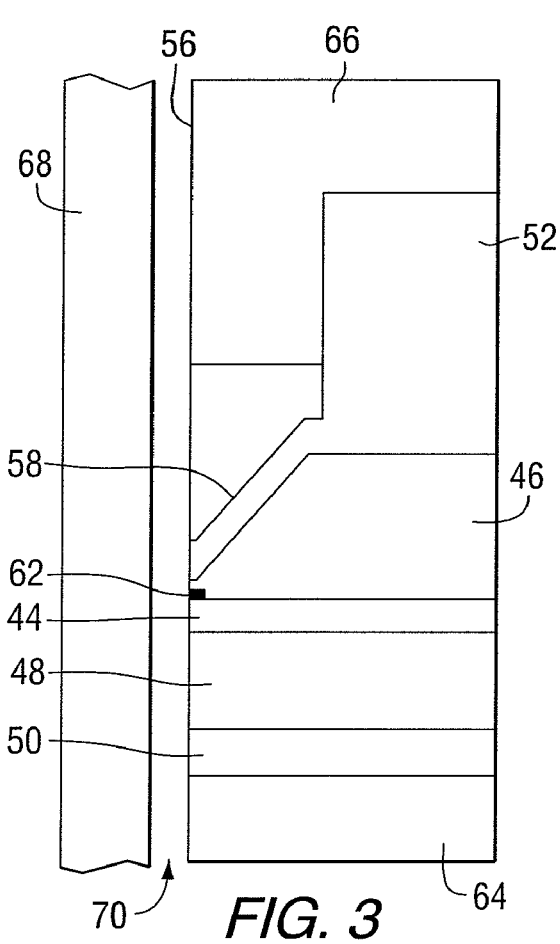
FIG. 3 is an enlarged view of a portion of the recording head of FIG. 2.

FIG. 3 is an enlarged view of a portion of the recording head of FIG. 2. When used in a data storage device, the recording head is positioned adjacent to a data recording media 68 and separated from the recording media by an air bearing 70. Light is coupled into the waveguide and directed toward the recording media to heat a portion of the recording media, thereby reducing the coercivity of the heated portion. The near-field transducer serves to concentrate the light into a small spot on the recording media. A magnetic field from the write pole is used to set the direction of magnetization of the heated portion of the recording media.

Figure 4:
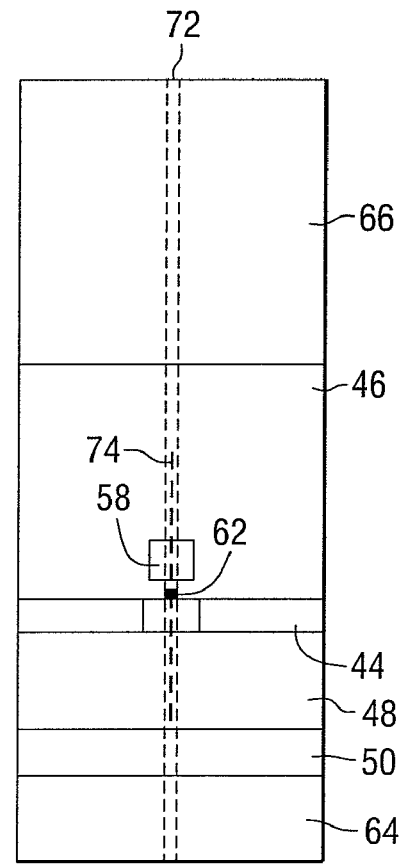
FIG. 4 is an enlarged view of a portion of the air bearing surface of the recording head of FIG. 2.

FIG. 4 is an enlarged view of a portion of the air bearing surface of the recording head of FIG. 2. In operation, data is stored in tracks on the media. An approximate location of a data track is illustrated as item 72 in FIG. 3. The near-field transducer and the end of the write pole are aligned on a common line 74 in a direction parallel to the track direction.

The waveguide conducts energy from a source of electromagnetic radiation, which may be, for example, ultraviolet, infrared, or visible light. The source may be, for example, a laser diode, or other suitable laser light source for directing a light beam toward the waveguide. Various techniques that are known for coupling the light beam into the waveguide may be used. For example, the light source may work in combination with an optical fiber and external optics for collimating the light beam from the optical fiber toward a diffraction grating on the waveguide. Alternatively, a laser may be mounted on the waveguide and the light beam may be directly coupled into the waveguide without the need for external optical configurations. Once the light beam is coupled into the waveguide, the light propagates through the waveguide toward a truncated end of the waveguide that is formed adjacent the air bearing surface (ABS) of the recording head. Light exits the end of the waveguide and heats a portion of the media, as the media moves relative to the recording head. A near-field transducer can be positioned in or adjacent to the waveguide to further concentrate the light in the vicinity of the air bearing surface.

As illustrated in FIGS. 2, 3 and 4, the recording head 42 also includes a structure for heating the magnetic recording media 16 proximate to where the write pole 30 applies the magnetic write field H to the recording media 16. While FIGS. 2, 3 and 4 show an example recording head, it should be understood that the invention is not limited to the particular structure shown in FIGS. 2, 3 and 4.

Figure 5:
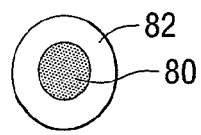
FIGS. 5 and 6 are schematic representations of the shape of optical and thermal profiles that define the written transition shape in a continuous HAMR media.
Figure 6:
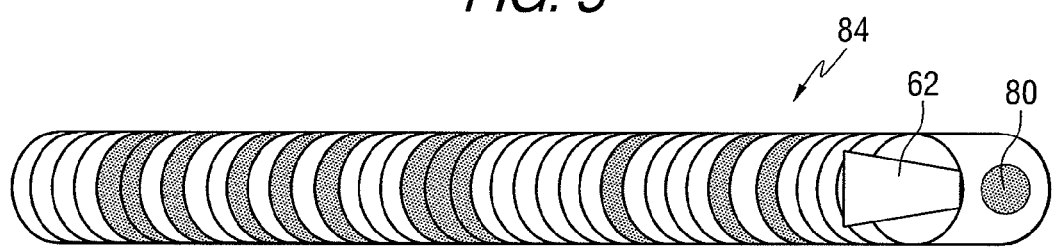

FIGS. 5 and 6 are schematic representations of the shape of optical and thermal profiles that define the written transition shape in a continuous HAMR media. FIG. 3 shows an optical spot 80 and a thermal profile 82 representing the temperature rise in the media caused by the optical spot. The optical spot has a circular symmetry and the diameter of the thermal spot size can be larger than the full width half maximum (FWHM) diameter of the optical spot. Although the media can be heated up to the Curie temperature ($T_c$), the transition will form at somewhere below $T_c$ where the write field matches the media coercivity $H_c$. The actual thermal spot size will be different from the optical spot size, with the ratio of the spot sizes being dependent on many factors. The typical ratio is around 1.5-2.5:1.

As the media moves relative to the recording head, electromagnetic radiation is coupled from the near-field transducer 62 into the media. The thermal spots expand and cool down as the media moves away from NFT. The heated portion of the media is then subjected to a magnetic field to cause transitions in the direction of magnetization of domains in the media. The resulting transition regions have a curved edge as illustrated by transition regions 84 in FIG. 6.

Figure 7:
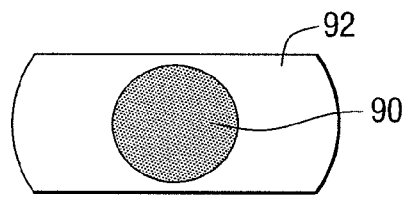
FIGS. 7 and 8 are schematic representations of the shape of optical and thermal profiles that define the written transition shape in a discrete track HAMR media.
Figure 8:
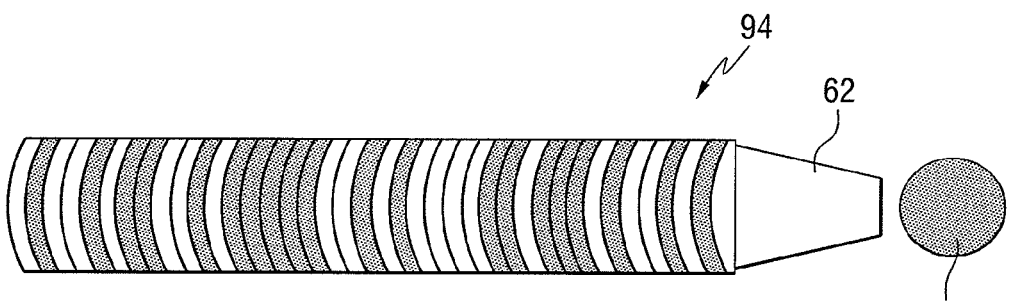

Discrete track magnetic recording media includes a plurality of concentric tracks of magnetic material on or adjacent to the surface of the media. FIGS. 7 and 8 are schematic representations of the shape of optical and thermal profiles that define the written transition shape in a discrete track HAMR media. FIGS. 5 and 6 show an optical spot 90 and a thermal profile 92 representing the temperature rise in the media caused by the optical spot. As the media moves relative to the recording head, electromagnetic radiation is coupled from the near-field transducer 62 into the media. The heated portion of the media is then subjected to a magnetic field to cause transitions in the direction of magnetization of domains in the media. The resulting transition regions have a curved edge as illustrated by transition regions 94 in FIG. 8. The heat dissipation in the cross track dimension is limited and the thermal spot size is expanded in down track direction. As a result, the curvature of the transitions is reduced when compared with the continuous media case, or in other words, for the same curvature, the written track width is smaller, but extends more in down track direction.

For the same thermal power, the target track width is reduced or limited by the discrete track media track pitch and the relative (normalized) transition curvature is improved due to more expansion of the transition profile away from the center of the heat spot. In addition, because the thermal profile is limited in the cross track direction, it is expanded more in the down track direction. This will lead to better alignment between the thermal spot and the magnetic field due to the separation between the write pole and the NFT.

FIGS. 9 through 19 are cross-sectional views of different embodiments of DTM using different materials for the tracks (i.e., in the on track positions) and between the tracks (i.e., in the off track positions).

Figure 9:
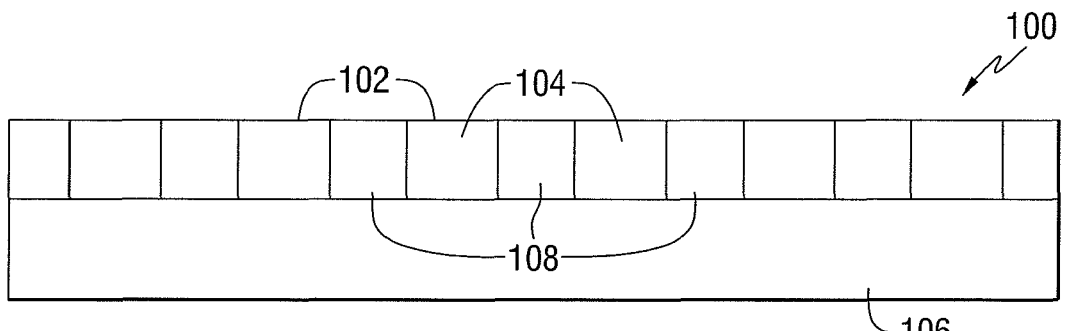
FIGS. 9 through 20 are cross-sectional views of discrete track media.

Referring to FIG. 9, the media 100 includes a plurality of tracks 102 of magnetic material 104 on a substrate 106. The spaces between the tracks (i.e., the off track positions) are filled with thermal barrier material 108. The magnetic material can be for example FePt and the tracks can be fabricated as a multilayer structure. The thermal barrier material typically can be any type of oxide or nitride material, for example AlO, TiO, TaO, MgO, SiN, TiN or AlN.

Figure 10:
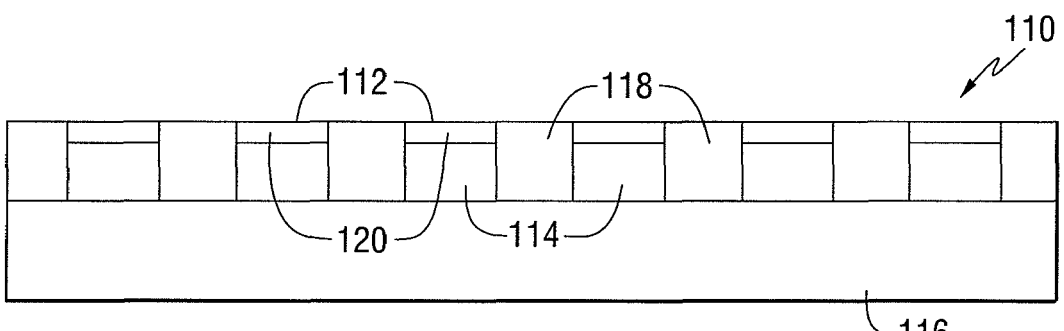

FIG. 10 is a cross-sectional view of a discrete track media 110 including a plurality of tracks 112 of magnetic material 114 on a substrate 116. The spaces between the tracks (i.e., the off track positions) are filled with thermal barrier material 118. Plasmonic material 120 is positioned under the magnetic material between the magnetic material and the substrate.

Figure 11:
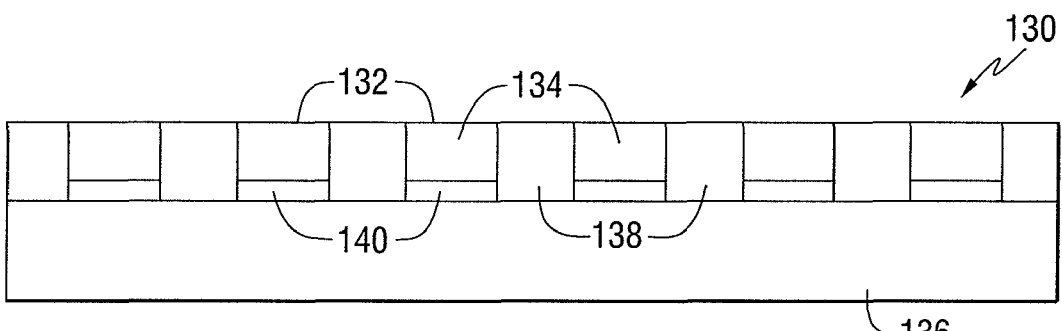

FIG. 11 is a cross-sectional view of a discrete track media 130 including a plurality of tracks 132 of magnetic material 134 on a substrate 136. The spaces between the tracks (i.e., the off track positions) are filled with thermal barrier material 138. A continuous layer of plasmonic material 140 is positioned on top of the magnetic material.

Figure 12:
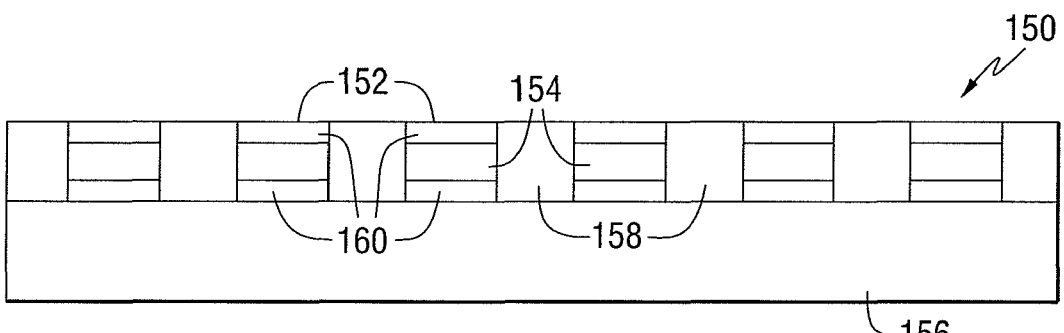

FIG. 12 is a cross-sectional view of a discrete track media 150 including a plurality of tracks 152 of magnetic material 154 on a substrate 156. The spaces between the tracks (i.e., the off track positions) are filled with thermal barrier material 158. Continuous layer of plasmonic material 160 is positioned on top of the magnetic material and under the magnetic material between the magnetic material and the substrate.

Figure 13:
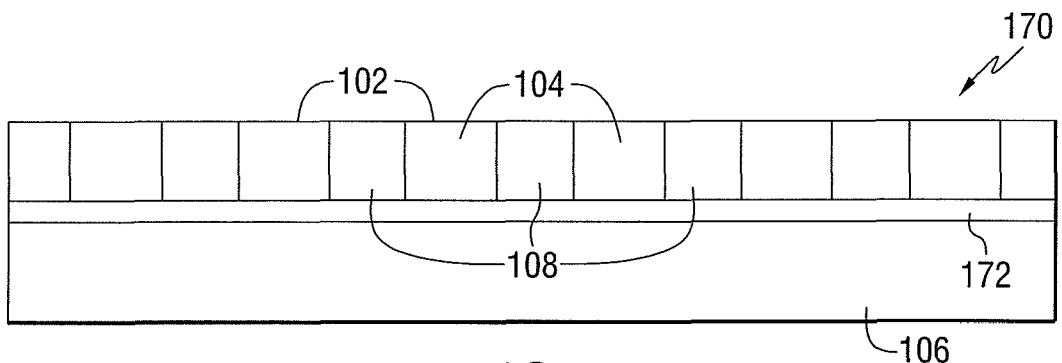

FIG. 13 is a cross-sectional view of a discrete track media 170 including the elements of FIG. 9, and further including a continuous heat sink layer 172 between the tracks and the substrate.

Figure 14:
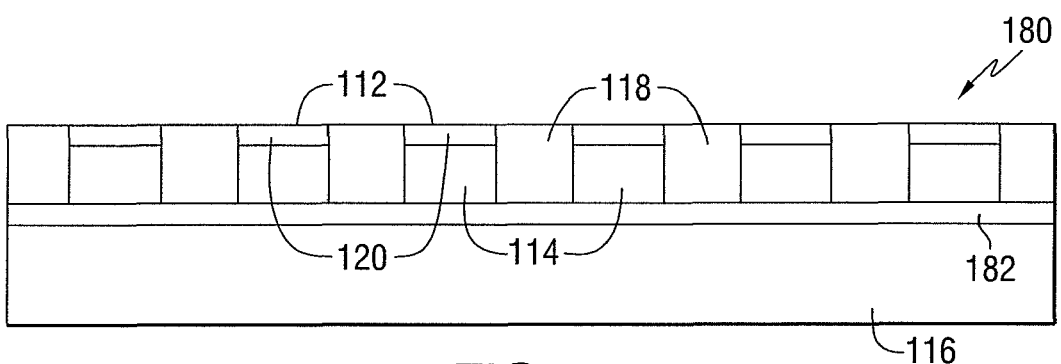

FIG. 14 is a cross-sectional view of a discrete track media 180 including the elements of FIG. 10, and further including a continuous heat sink layer 182 between the tracks and the substrate.

Figure 15:
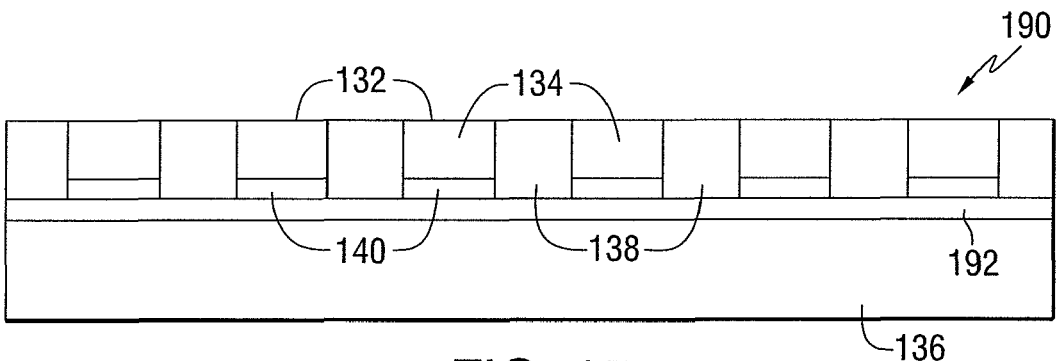

FIG. 15 is a cross-sectional view of a discrete track media 190 including the elements of FIG. 11, and further including a continuous heat sink layer 192 between the tracks and the substrate.

Figure 16:
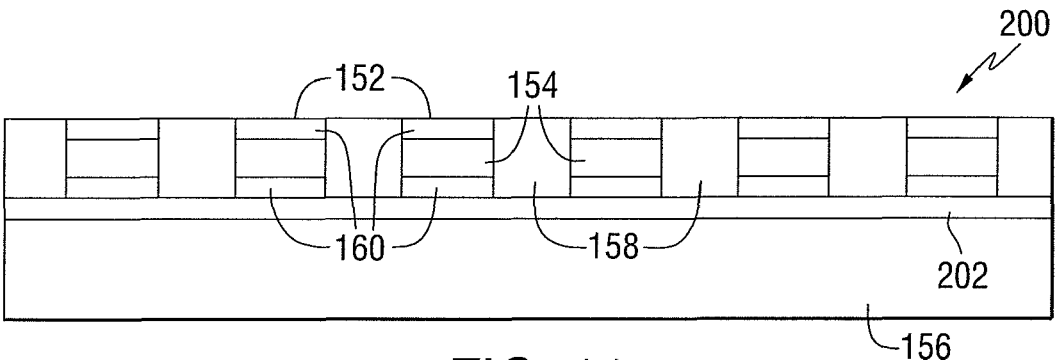

FIG. 16 is a cross-sectional view of a discrete track media 200 including the elements of FIG. 12, and further including a continuous heat sink layer 202 between the tracks and the substrate.

Figure 17:
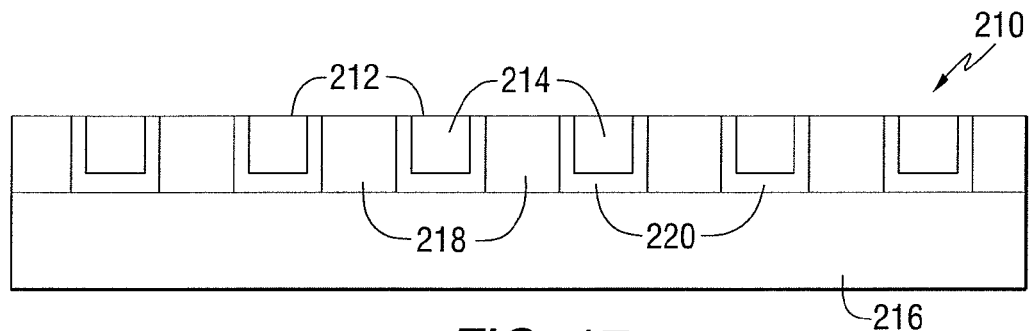

FIG. 17 is a cross-sectional view of a discrete track media 210 including a plurality of tracks 212 of magnetic material 214 on a substrate 216. The spaces between the tracks (i.e., the off track positions) are filled with thermal barrier material 218. A continuous layer of plasmonic material 220 is positioned under the magnetic material between the magnetic material and the substrate and adjacent to the sides of the magnetic material.

Figure 18:
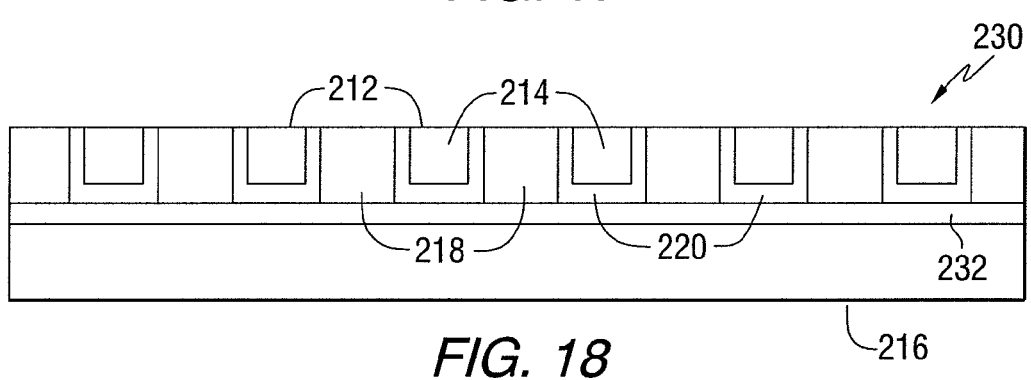

FIG. 18 is a cross-sectional view of a discrete track media 230 including the elements of FIG. 17, and further including a continuous heat sink layer 232 between the tracks and the substrate.

Figure 19:
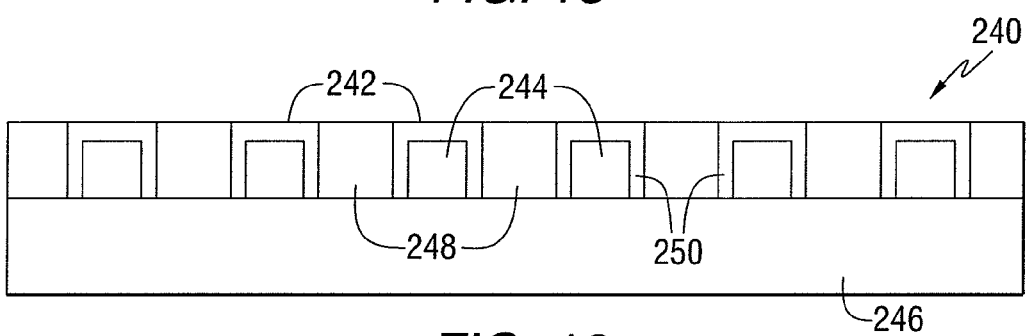

FIG. 19 is a cross-sectional view of a discrete track media 240 including a plurality of tracks 242 of magnetic material 244 on a substrate 246. The spaces between the tracks (i.e., the off track positions) are filled with thermal barrier material 248. A continuous layer of plasmonic material 250 is positioned on top of the magnetic material and adjacent to the sides of the magnetic material.

Figure 20:
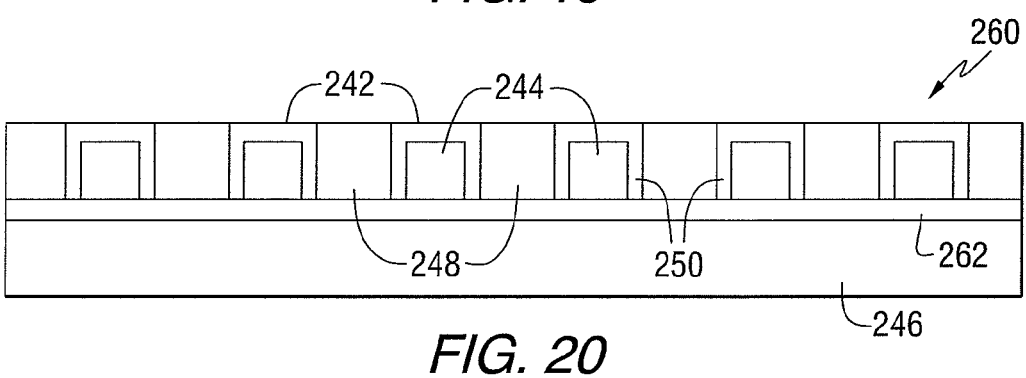

FIG. 20 is a cross-sectional view of a discrete track media 260 including the elements of FIG. 17, and further including a continuous heat sink layer 262 between the tracks and the substrate.

As used in this description, plasmonic material is typically a low loss non-magnetic metallic material. Examples of plasmonic materials include Au, Ag, Cu and their alloys.

Figure 21:
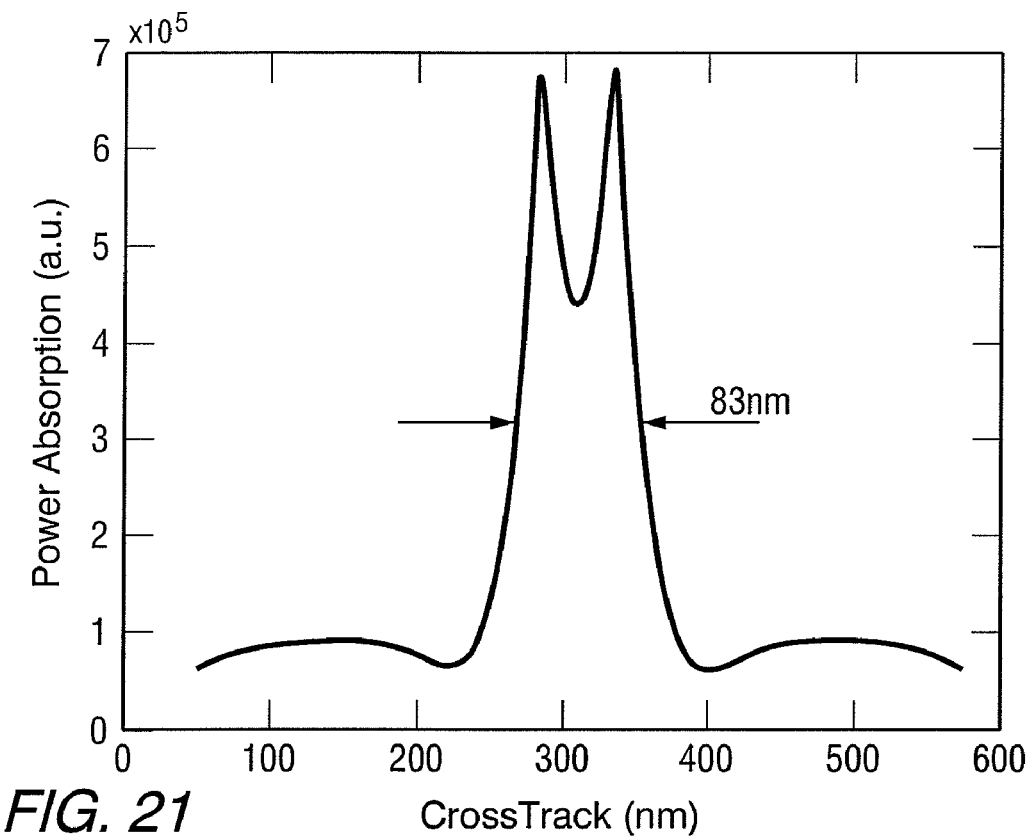
FIGS. 21 and 22 are graphs of power absorption in a cross track direction.

FIG. 21 is a graph of the optical power absorption in conventional continuous HAMR media in the cross track direction. In conventional HAMR media, the full width half maximum (FWHM) cross track optical spot size is determined both by the physical dimension of the near-field transducer (NFT) on the HAMR recording head and head to media spacing (HMS). In one example, a 50 nm wide NFT will provide 80 nm FWHM cross track optical spot size at 7.5 nm HMS, but the spot size increases to 90 nm at 10 nm HMS. The coupling efficiency will be greatly reduced at larger HMS. Further reducing the physical width (<40 nm) of NFT will also normally reduce the efficiency of NFT.

Figure 22:
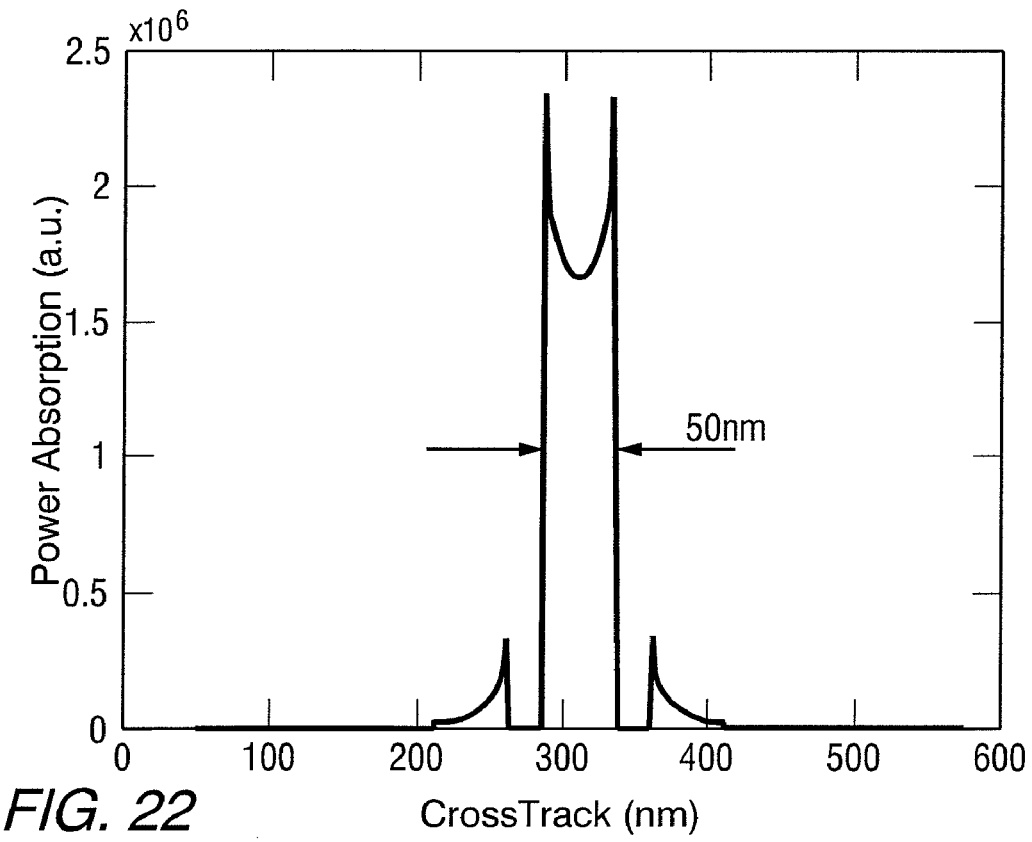

FIG. 22 shows the optical power absorption for a discrete track media (DTM) having a 50 nm wide track with 25 nm track spacing in the cross track direction. In DTM, the FWHM cross track optical spot size is solely determined by the track width, independent of the physical dimension of NFT in HAMR recording head and HMS. It is possible that the same NFT design could be used for different areal density. The head efficiency will be very similar in different areal density, which will also benefit HAMR system integration. The curvatures of the optical profile, therefore thermal profile in cross track and down track directions, are greatly improved in DTM. In addition, due to better optical confinement in DTM, the coupling efficiency is increased by two times from 1.51% for conventional HAMR media to 4.57% for DTM using the same 50 nm wide NFT as this is also evidenced in the peak power absorption values in FIGS. 21 and 22.

A simpler and more efficient transducer design may be utilized in DTM compared to conventional HAMR media since the cross track optical field confinement is pre-defined by the discrete track width.

Figure 23:
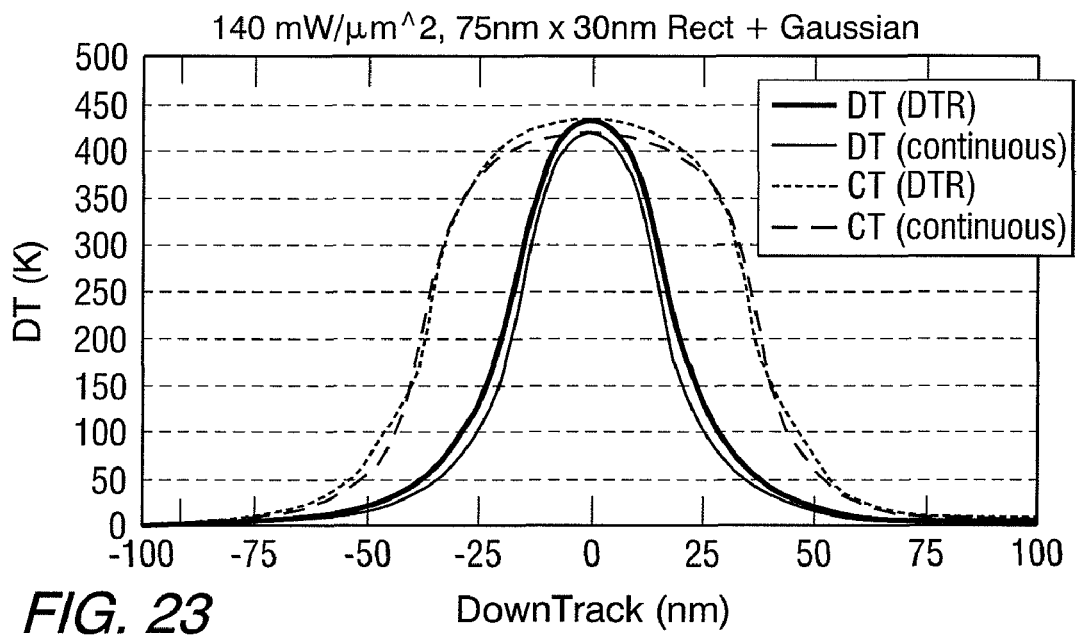
FIG. 23 is a graph of temperature in a down track direction.

FIG. 23 shows the temperature profile calculated for DTM vs. continuous media. The results show that the down track profile is pushed with bubble expansion while the cross track profile is limited by track. While the dimension and selection are not yet optimized for DTR, the results of track curvature, thermal profile location and the thermal profile control is already well under control for DTM as compare to continuous media.

Figure 24:
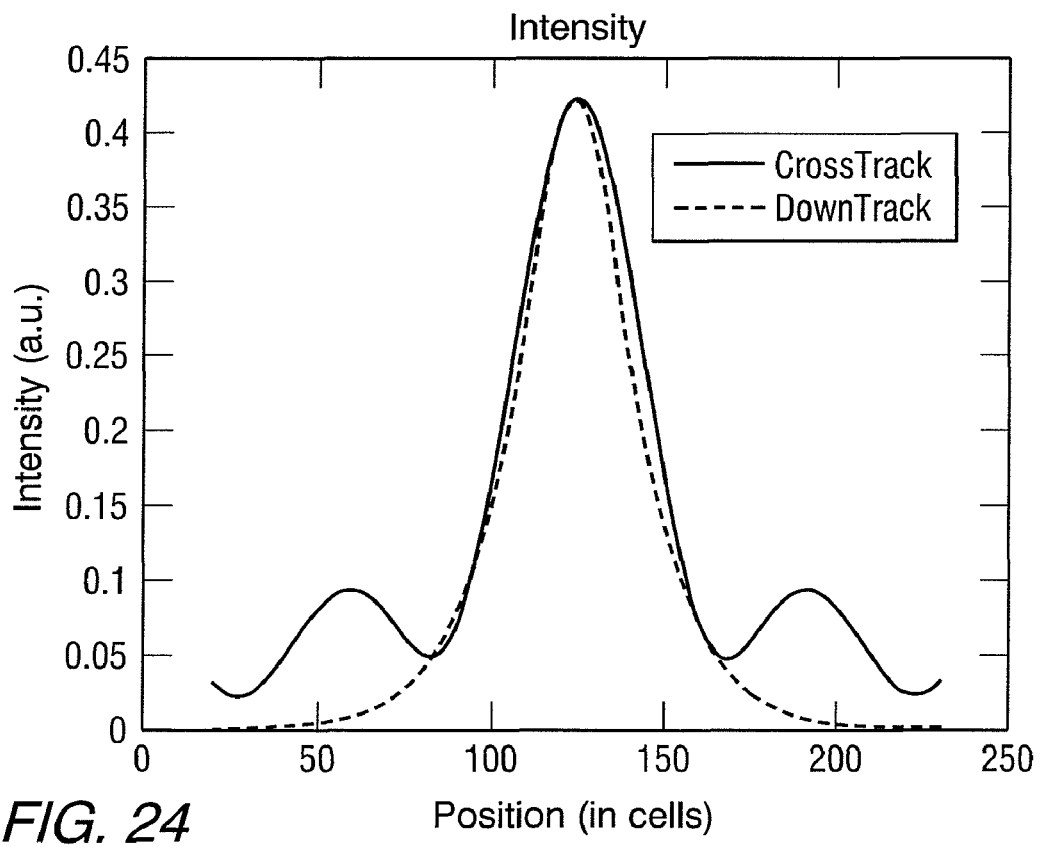
FIG. 24 is a graph of intensity versus position.
Figure 25:
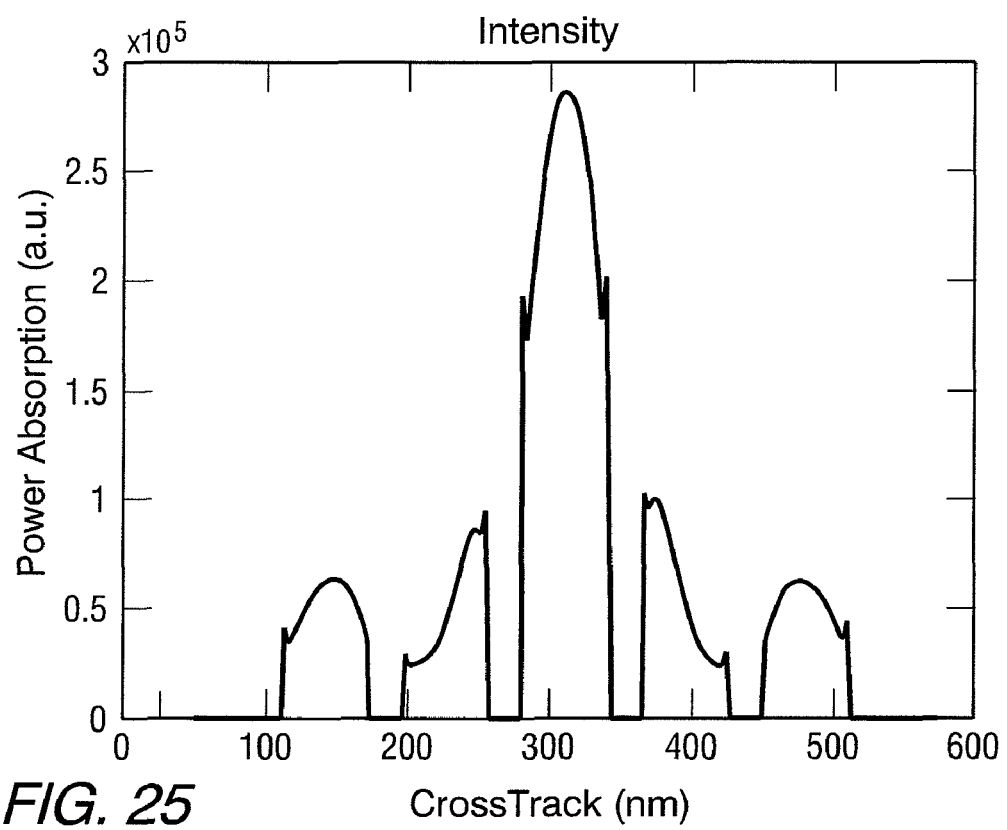
FIG. 25 is a graph of power absorption in a cross track direction.
Figure 26:
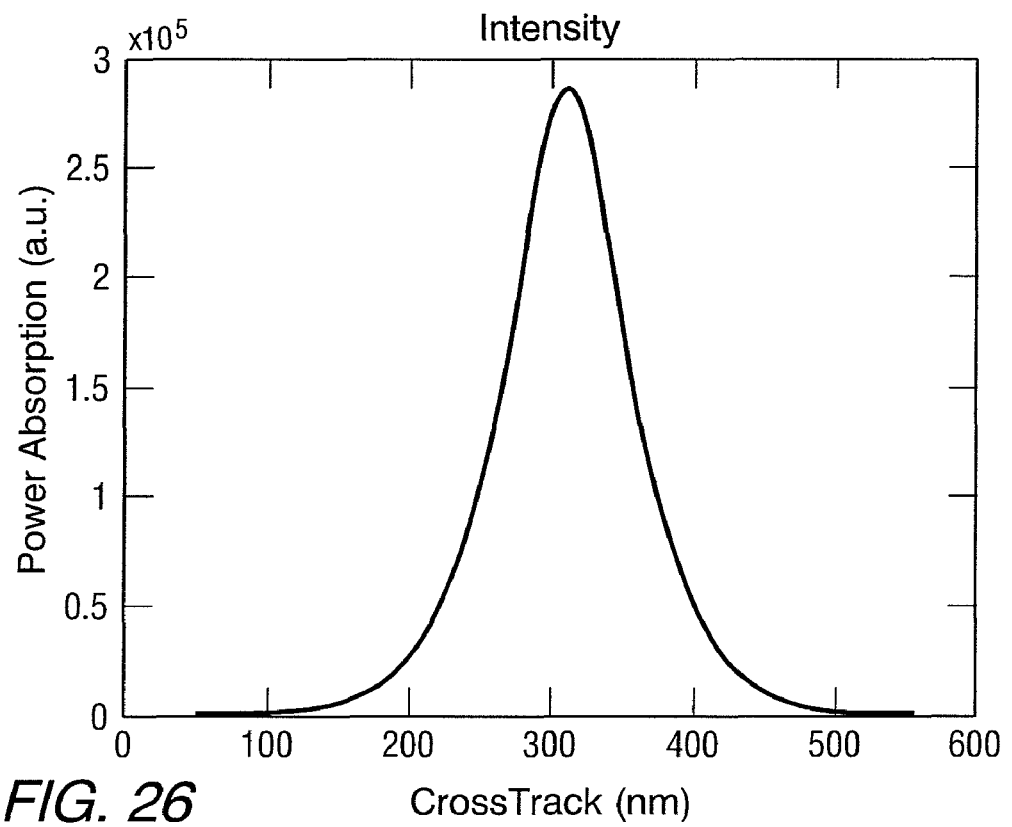
FIG. 26 is a graph of power absorption in a down track direction.

FIGS. 24, 25 and 26 show simulation results for the coupling efficiency as a function of down track and cross track position. The results show that with DTM, the thermal profile can be limited in the cross track direction and thermal contour will be increased slightly in the down track direction.

The magnetic material can be for example CoCrPt granular media with or without an exchange coupling composite (ECC) structure. In addition, Co/Pt granular multilayer, FePt based $L1_0$ alloys and a synthetic media approach, i.e., combining high Curie temperature $T_c$ and low Curie temperature $T_c$ materials in multi-stack manner, can be potential candidates for the magnetic material. The non-magnetic metallic layer can be selected from for example Au, Ag or Mo, etc.

Figure 27:
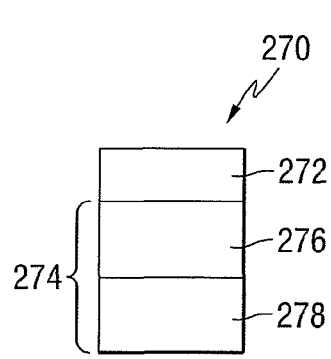
FIGS. 27-32 are cross-sectional views of various track structures that can be used in discrete track media.
Figure 28:
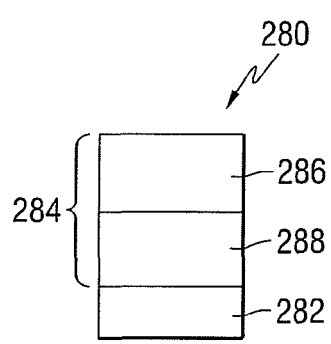
Figure 29:
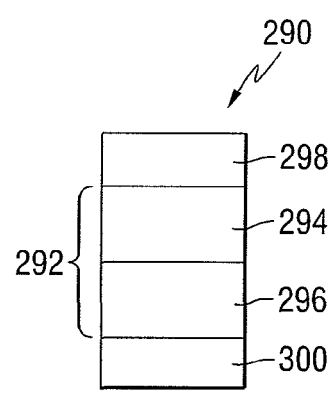
Figure 30:
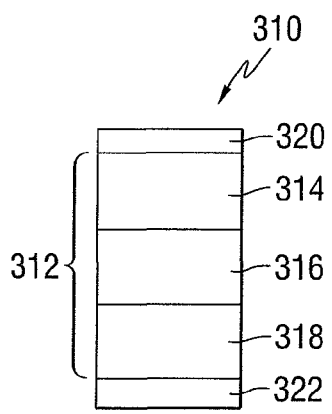
Figure 31:
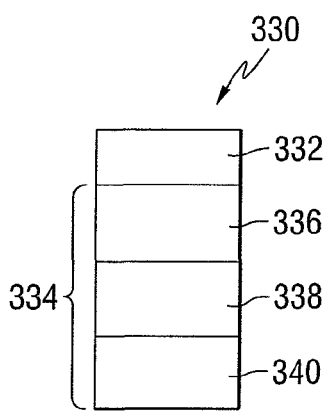
Figure 32:
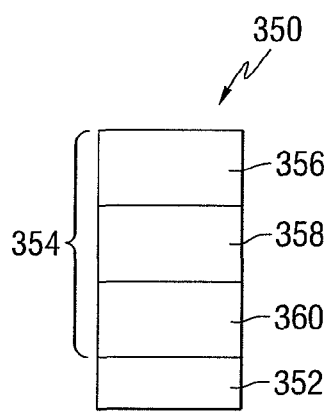

FIGS. 27-32 are cross-sectional views of various track structures that can be used in discrete track media. FIG. 27 shows a track 270 having a top plasmonic layer 272 on a multilayer stack 274 of ferromagnetic materials in layers 276 and 278. FIG. 28 shows a track 280 having a bottom plasmonic layer 282 under a multilayer stack 284 of ferromagnetic materials in layers 286 and 288. FIG. 29 shows a track 290 having a multilayer stack 292 of ferromagnetic materials in layers 294 and 296 between top and bottom layers 298 and 300 of plasmonic. FIG. 30 shows a track 310 having a multilayer stack 312 of ferromagnetic materials in layers 314, 316 and 318 between top and bottom layers 320 and 322 of plasmonic. FIG. 31 shows a track 330 having a top plasmonic layer 332 on a multilayer stack 334 of ferromagnetic materials in layers 336, 338 and 340. FIG. 32 shows a track 350 having a bottom plasmonic layer 352 under a multilayer stack 354 of ferromagnetic materials in layers 356, 358 and 360. In FIGS. 27-32, the magnetic materials can be, for example, FePtCu or FePtBCu, with varying amounts of Cu to form layers having different anisotropy and different Curie temperatures.

What is claimed is:

1. An apparatus comprising:
a discrete track recording media including a substrate, a plurality of concentric tracks of continuous magnetic material on the substrate, and a non-magnetic material between the tracks;
a recording head having an air bearing surface positioned adjacent to the recording media, and including a magnetic pole, an optical transducer, and a near-field transducer, wherein the near-field transducer directs electromagnetic radiation onto tracks to heat portions of the tracks and a magnetic field from the magnetic pole is used to create magnetic transitions in the heated portions of the tracks; and
a continuous layer of plasmonic material positioned in the recording media and adjacent to the magnetic material to increase coupling between the electromagnetic radiation and the magnetic material.

2. The apparatus of claim 1, wherein the near-field transducer directs the electromagnetic radiation to a spot having a diameter less than a width of the tracks.

3. The apparatus of claim 1, wherein the plasmonic material is positioned on top of the magnetic material.

4. The apparatus of claim 1, wherein the plasmonic material is positioned under the magnetic material.

5. The apparatus of claim 1, wherein the plasmonic material is positioned both on top of and under the magnetic material.

6. The apparatus of claim 1, wherein the plasmonic material is positioned both on top of the magnetic material, and on opposite sides of the magnetic material.

7. The apparatus of claim 1, wherein the plasmonic material is positioned both under the magnetic material, and on opposite sides of the magnetic material.

8. The apparatus of claim 1, wherein the recording media further comprises a heat sink layer between the substrate and the magnetic material.

9. The apparatus of claim 1, wherein the magnetic material comprises:
a multilayer stack of at least two different types of magnetic material.

10. The apparatus of claim 9, wherein the plasmonic material is positioned on top of the multilayer stack.

11. The apparatus of claim 9, wherein the plasmonic material is positioned under the multilayer stack.

12. The apparatus of claim 9, wherein the plasmonic material is positioned both on top of and under the multilayer stack.

13. The apparatus of claim 9, wherein the plasmonic material is positioned both on top of the magnetic material, and on opposite sides of the multilayer stack.

14. The apparatus of claim 9, wherein the plasmonic material is positioned both under the magnetic material, and on opposite sides of the multilayer stack.

15. The apparatus of claim 9, wherein the multilayer stack comprises:
a first layer of FePtCu or FePtBCu; and
a second layer of FePtCu or FePtBCu.

16. The apparatus of claim 1, wherein the magnetic material comprises:
one or more of CoCrPt granular media with or without an exchange coupling composite structure, a Co/Pt granular multilayer, and an FePt based $L1_0$ alloy.

17. The apparatus of claim 1, wherein the plasmonic material comprises:
one or more of Au, Ag, Cu and alloys of Au, Ag or Cu.

18. The apparatus of claim 1, wherein the non-magnetic material comprises:
a nitride material.

19. The apparatus of claim 1, wherein the non-magnetic material comprises:
one or more of AlO, TiO, TaO, MgO, SiN, TiN, or AlN.

20. An apparatus comprising:
a recording media including a substrate, a plurality of concentric tracks of continuous magnetic material on the substrate, and a non-magnetic material between the tracks;
a recording head having an air bearing surface positioned adjacent to the recording media, and including a magnetic pole, an optical transducer, and a near-field transducer, wherein the near-field transducer directs electromagnetic radiation onto tracks to heat portions of the tracks and a magnetic field from the magnetic pole is used to create magnetic transitions in the heated portions of the tracks; and
a continuous layer of plasmonic material positioned in the recording media and adjacent to the magnetic material to increase coupling between the electromagnetic radiation and the magnetic material, wherein the tracks have a width of about 50 nm and are separated by about 25 nm.

* * * * *